US009362769B2

(12) United States Patent
Zhou et al.

(10) Patent No.: US 9,362,769 B2
(45) Date of Patent: Jun. 7, 2016

(54) METHOD AND APPARATUS FOR POWER SUPPLY CONTROL AND ELECTRONIC DEVICE

(75) Inventors: Fei Zhou, Beijing (CN); Yinsi Yang, Beijing (CN); Bo Liu, Beijing (CN); Zhenxin Xi, Beijing (CN)

(73) Assignees: BEIJING LENOVO SOFTWARE LTD., Beijing (CN); LENOVO (BEIJING) LIMITED, Beijing (CN)

( * ) Notice: Subject to any disclaimer, the term of this patent is extended or adjusted under 35 U.S.C. 154(b) by 159 days.

(21) Appl. No.: 14/118,987

(22) PCT Filed: May 23, 2012

(86) PCT No.: PCT/CN2012/075945
 § 371 (c)(1),
 (2), (4) Date: Nov. 20, 2013

(87) PCT Pub. No.: WO2012/163243
 PCT Pub. Date: Dec. 6, 2012

(65) Prior Publication Data
 US 2014/0070758 A1    Mar. 13, 2014

(30) Foreign Application Priority Data

May 31, 2011  (CN) .......................... 2011 1 0145032

(51) Int. Cl.
 *H02J 7/00*    (2006.01)
 *H01M 10/44*    (2006.01)
 *G06F 1/26*    (2006.01)
(52) U.S. Cl.
 CPC .............. *H02J 7/0054* (2013.01); *G06F 1/266* (2013.01); *H01M 10/44* (2013.01); *H02J 7/0036* (2013.01); *H02J 7/0052* (2013.01); *H02J 2007/0062* (2013.01)

(58) Field of Classification Search
 CPC .............. B60L 11/182; B60L 11/1833; B60L 11/1829; B60L 11/1861; B60L 2210/40; B60L 2210/10; B60L 11/1851; B60L 2230/40
 USPC .................................................. 320/104, 108
 See application file for complete search history.

(56) References Cited

U.S. PATENT DOCUMENTS

| 6,963,933 B2 | 11/2005 | Saito et al. |
| 8,237,414 B1* | 8/2012 | Li .......................... H02J 7/0003 320/103 |
| 2004/0103223 A1 | 5/2004 | Gabehart et al. |
| 2010/0070659 A1* | 3/2010 | Ma ........................ G06F 13/385 710/14 |

FOREIGN PATENT DOCUMENTS

| CN | 1780085 A | 5/2006 |
| CN | 102025001 | 4/2011 |

OTHER PUBLICATIONS

English translation of Abstract of Chinese Pat. No. 102025001 A.
English translation of Abstract of Chinese Pat. No. 1780085 A.

*Primary Examiner* — Nghia Doan

(57) ABSTRACT

The present invention provides a method and an apparatus for power supply control as well as an electronic device. The method comprises: detecting that the first device is connected with the second device via the first physical interface, when the first device is in the unconnected state; determining whether the connection between the first and second devices satisfies a first predetermined condition or not, so as to obtain a first determination result; switching the first device from the unconnected state to the first connected state when the first determination result indicates that the connection satisfies the first predetermined condition; obtaining power supply requirement information of the second device that indicates whether the first device is required to supply power to the second device or not; and controlling the power supply to the second device via the first physical interface based on the power supply requirement information.

8 Claims, 4 Drawing Sheets

METHOD AND APPARATUS FOR POWER SUPPLY CONTROL AND ELECTRONIC DEVICE

CROSS REFERENCE TO RELATED APPLICATIONS

This application is based on International Application No. PCT/CN2012/075945 filed on May 23, 2012, which claims priority to Chinese National Application No. 201110145032.7, filed on May 31, 2011, the contents of which are incorporated herein by reference.

TECHNICAL FIELD

The present invention relates to a technical field of power supply control for electronic devices, and more particularly, to a method and an apparatus for power supply control as well as an electronic device.

BACKGROUND

There are more and more types of electronic devices. Some electronic devices have their own batteries to supply power required for their operations, other electronic devices can only operate with external power sources, and there are also some electronic devices that can be powered by either internal batteries or external power sources.

Electronic devices can be inter-connected via a physical interface to communicate with each other based on a certain protocol. According to some protocol (e.g., Universal Serial Bus, or USB, protocol), once two electronic devices are connected, it is necessary to determine one of them as a host device and the other as a slave device according to procedures defined in the protocol. The electronic device acting as the host device needs to supply power to the slave device, so as to activate the slave device and then control it (e.g., reading data from or writing data into the slave device).

However, such power supply scheme is not sufficiently flexible in some situations. For example, a mobile phone of a user typically has many files stored therein and the user can process these files on an operation interface of the mobile phone. If the user wants to output these files via an external device (e.g., to play a music file currently being played on the mobile phone via a vehicle audio system) while processing these files, he/she needs to connect his/her mobile phone to the vehicle audio system via a physical interface (such as a USB interface) such that the audio signal from the mobile phone can be output to the vehicle audio system. In this case, the mobile phone acts as a host device and the vehicle audio system acts as a slave device. According to the existing protocol procedure, after the vehicle audio system is connected to the mobile phone, the mobile phone acting as the host device will supply power to the vehicle audio system acting as the slave device.

Because the mobile phone has limited power, the vehicle audio system is self-powered and its power consumption is much higher than that of the mobile phone, it is thus unreasonable for the mobile phone to supply power to the vehicle audio system as in that case the battery lifetime of the mobile phone would be significantly reduced.

Therefore, there is a need for a method capable of providing reasonable power supply control between electronic devices.

SUMMARY

It is an object of the present invention to provide a method and an apparatus for power supply control as well as an electronic device, capable of providing reasonable power supply control between electronic devices.

In order to achieve the above object, the following embodiments are provided according to the present invention.

According to an embodiment of the present invention, a method for power supply control for a first device is provided. The first device includes a first physical interface and has an unconnected state in which the first device is not connected with a second device via the first physical interface and a first connected state in which the first device is connected with the second device via the first physical interface so as to actively transmit a control command to the second device via the first physical interface. The method includes the following steps of: detecting that the first device is connected with the second device via the first physical interface, when the first device is in the unconnected state; determining whether the connection between the first device and the second device via the first physical interface satisfies a first predetermined condition or not, so as to obtain a first determination result; switching the first device from the unconnected state to the first connected state when the first determination result indicates that the connection between the first device and the second device via the first physical interface satisfies the first predetermined condition; obtaining power supply requirement information of the second device that indicates whether the first device is required to supply power to the second device or not; and controlling power supply to the second device via the first physical interface based on the power supply requirement information of the second device.

In a preferred embodiment, said controlling power supply to the second device via the first physical interface based on the power supply requirement information of the second device includes: controlling to supply power to the second device via the first physical interface when the power supply requirement information indicates that the first device is required to supply power to the second device; and controlling not to supply power to the second device via the first physical interface when the power supply requirement information indicates that the first device is not required to supply power to the second device.

In a preferred embodiment, said controlling to supply power to the second device via the first physical interface when the power supply requirement information indicates that the first device is required to supply power to the second device includes: obtaining a current power supply state of the first device; maintaining the current power supply state of the first device when the current power supply state indicates that the first device is supplying power to the second device; and supplying power to the second device via the first physical interface when the current power supply state indicates that the first device is not supplying power to the second device. Said controlling not to supply power to the second device via the first physical interface when the power supply requirement information indicates that the first device is not required to supply power to the second device includes: obtaining a current power supply state of the first device; stopping the first device from supplying power to the second device via the first physical interface when the current power supply state indicates that the first device is supplying power to the second device; and maintaining the current power supply state of the first device when the current power supply state indicates that the first device is not supplying power to the second device.

In a preferred embodiment, said controlling not to supply power to the second device via the first physical interface when the power supply requirement information indicates that the first device is not required to supply power to the second device includes: obtaining charging capability information of the second device; controlling not to supply power to the second device via the first physical interface when the charging capability information indicates that the first device is not required to supply power to the second device; transmitting a charging request to the second device when the charging capability information indicates that the second device is capable of charging the first device; and receiving power from the second device for charging the first device via the first physical interface.

In a preferred embodiment, said switching the first device from the unconnected state to the first connected state includes: switching the first device from the unconnected state to the first connected state; and supplying power to the second device via the first physical interface.

In a preferred embodiment, said obtaining power supply requirement information of the second device includes: transmitting a first control command to the second device for requesting the power supply requirement information of the second device; and receiving the power supply requirement information fed back from the second device in response to the first control command.

In a preferred embodiment, said obtaining power supply requirement information of the second device includes: refraining from supplying power to the second device via the first physical interface after the first device is switched from the unconnected state to the first connected state; detecting, at the first physical interface, a predetermined signal from the second device for a first predetermined time period, so as to obtain a first detection result; and obtaining the power supply requirement information based on the first detection result.

According to an embodiment of the present invention, an apparatus for power supply control for a first device is provided. The first device includes a first physical interface and has an unconnected state in which the first device is not connected with a second device via the first physical interface and a first connected state in which the first device is connected with the second device via the first physical interface so as to actively transmit a control command to the second device via the first physical interface. The apparatus includes: a first detecting unit configured to detect that the first device is connected with the second device via the first physical interface, when the first device is in the unconnected state; a first determining unit configured to determine whether the connection between the first device and the second device via the first physical interface satisfies a first predetermined condition or not, so as to obtain a first determination result; a first switching unit configured to switch the first device from the unconnected state to the first connected state when the first determination result indicates that the connection between the first device and the second device via the first physical interface satisfies the first predetermined condition; a first obtaining unit configured to obtain power supply requirement information of the second device that indicates whether the first device is required to supply power to the second device or not; and a power supply control unit configured to control power supply to the second device via the first physical interface based on the power supply requirement information of the second device.

In a preferred embodiment, the power supply control unit includes: a first control unit configured to control to supply power to the second device via the first physical interface when the power supply requirement information indicates that the first device is required to supply power to the second device; and a second control unit configured to control not to supply power to the second device via the first physical interface when the power supply requirement information indicates that the first device is not required to supply power to the second device.

In a preferred embodiment, wherein the first control unit includes: a second obtaining unit configured to obtain a current power supply state of the first device; a first processing unit configured to maintain the current power supply state of the first device when the current power supply state indicates that the first device is supplying power to the second device; and a second processing unit configured to supply power to the second device via the first physical interface when the current power supply state indicates that the first device is not supplying power to the second device. The second control unit includes: a third obtaining unit configured to obtain a current power supply state of the first device; a third processing unit configured to stop the first device from supplying power to the second device via the first physical interface when the current power supply state indicates that the first device is supplying power to the second device; and a fourth processing unit configured to maintain the current power supply state of the first device when the current power supply state indicates that the first device is not supplying power to the second device.

In a preferred embodiment, the second control unit includes: a fourth obtaining unit configured to obtain charging capability information of the second device; a fifth processing unit configured to control not to supply power to the second device via the first physical interface when the charging capability information indicates that the first device is not required to supply power to the second device; a first transmitting unit configured to transmit a charging request to the second device when the charging capability information indicates that the second device is capable of charging the first device; and a first receiving unit configured to receive power from the second device for charging the first device via the first physical interface.

In a preferred embodiment, the first switching unit includes: a first switch processing unit configured to switch the first device from the unconnected state to the first connected state; and a power supplying unit configured to supply power to the second device via the first physical interface.

In a preferred embodiment, the first obtaining unit includes: a second transmitting unit configured to transmit a first control command to the second device for requesting the power supply requirement information of the second device; and a second receiving unit configured to receive the power supply requirement information fed back from the second device in response to the first control command.

In a preferred embodiment, the first obtaining unit includes: a sixth processing unit configured to refrain from supplying power to the second device via the first physical interface after the first device is switched from the unconnected state to the first connected state; a second detecting unit configured to detect, at the first physical interface, a predetermined signal from the second device for a first predetermined time period, so as to obtain a first detection result; and an analysis obtaining unit configured to obtain the power supply requirement information based on the first detection result.

According to an embodiment of the present invention, a method for power supply control for a second device is provided. The second device includes a second physical interface and has an unconnected state in which the second device is not connected with a first device via the second physical interface and a second connected state in which the second device is connected with the first device via the second physical interface so as to passively receive a control command from the first device via the second physical interface. The method includes: detecting that the second device is connected with the first device via the second physical interface, when the second device is in the unconnected state; determining whether the connection between the second device and the first device via the second physical interface satisfies a second predetermined condition or not, so as to obtain a second determination result; switching the second device from the unconnected state to the second connected state when the second determination result indicates that the connection between the second device and the first device via the second physical interface satisfies the second predetermined condition; and feeding power supply requirement information of the second device back to the first device, such that the first device controls power supply to the second device via the second physical interface based on the power supply requirement information.

In a preferred embodiment, said switching the second device from the unconnected state to the second connected state includes: switching the second device from the unconnected state to the second connected state; and receiving power from the first device via the second physical interface.

In a preferred embodiment, said feeding power supply requirement information of the second device back to the first device includes: receiving a first control command transmitted from the first device for requesting the power supply requirement information of the second device; and feeding the power supply requirement information back to the first device in response to the first control command.

In a preferred embodiment, the method further includes: feeding charging capability information of the second device back to the first device; receiving a charging request transmitted from the first device when the charging capability information indicates that the second device is capable of charging the first device; and charging the first device via the second physical interface in response to the charging request.

According to an embodiment of the present invention, an apparatus for power supply control for a second device is provided. The second device includes a is second physical interface and has an unconnected state in which the second device is not connected with a first device via the second physical interface and a second connected state in which the second device is connected with the first device via the second physical interface so as to passively receive a control command from the first device via the second physical interface. The apparatus includes: a third detecting unit configured to detect that the second device is connected with the first device via the second physical interface, when the second device is in the unconnected state; a second determining unit configured to determine whether the connection between the second device and the first device via the second physical interface satisfies a second predetermined condition or not, so as to obtain a second determination result; a second switching unit configured to switch the second device from the unconnected state to the second connected state when the second determination result indicates that the connection between the second device and the first device via the second physical interface satisfies the second predetermined condition; and a first feedback unit configured to feed power supply requirement information of the second device back to the first device, such that the first device controls power supply to the second device via the second physical interface based on the power supply requirement information.

In a preferred embodiment, the second switching unit includes: a second switch processing unit configured to switch the second device from the unconnected state to the second connected state; and a power receiving unit configured to receive power from the first device via the second physical interface.

In a preferred embodiment, the feedback unit includes: a third receiving unit configured to receive a first control command transmitted from the first device for requesting the power supply requirement information of the second device; and a third transmitting unit configured to feed the power supply requirement information back to the first device in response to the first control command.

In a preferred embodiment, the apparatus further includes: a second feedback unit configured to feed charging capability information of the second device back to the first device; a third receiving unit configured to receive a charging request transmitted from the first device when the charging capability information indicates that the second device is capable of charging the first device; and a charging unit configured to charge the first device via the second physical interface in response to the charging request.

According to an embodiment of the present invention, an electronic device is provided. The electronic device includes: a physical interface including a first channel for transmitting power and a second channel for transmitting a control command, the first channel and the second channel being capable of operating simultaneously; and a processing unit configured to set the electronic device into a first operation state or a second operation state. The electronic device in the first operation state is capable of supplying power to an external device connected to the electronic device via the first channel of the physical interface and receiving a control command from the external device via the second channel of the physical interface. The electronic device in the second operation state is capable of receiving power for charging the electronic device via the first channel of the physical interface and outputting a control command to the external device via the second channel of the physical interface.

It can be seen from above that, with the method and apparatus for power supply control and the electronic device provided according to the embodiments of the present invention, when the first device is in the first connected state, it can obtain the power supply requirement information of the second device. Then, the first device determines whether it is required to supply power to the second device or not based on the power supply requirement information. In this way, when the first device is in the first connected state, it will not supply power to the second device unreasonably. The power supply is thus more flexible and can be applied in various application scenarios. Further, when the first device is in the first connected state, it can receive power from another device for charging itself as necessary.

DETAILED DESCRIPTION OF THE EMBODIMENTS

According to the embodiments of the present invention, power supply requirement information is communicated between devices and a reasonable power supply control process can be achieved based on the information. The power supply is thus more flexible and can be applied in various application scenarios. In the following, the embodiments of the present invention will be further detailed with reference to the figures.

First Embodiment

According to this embodiment, a method for power supply control is provided. The method is applied in a first device. The first device includes a first physical interface and has an unconnected state, a first connected state and a second connected state. Here the unconnected state is a state in which the first device is not connected with a second device via the first physical interface. The first connected state is a state in which the first device is connected with the second device via the first physical interface so as to actively transmit a control command to the second device via the first physical interface. The second connected state is a state in which the first device is connected with the second device via the first physical interface so as to passively receive a control command from the second device via the first physical interface.

For example, when the first physical interface is a USB interface, the unconnected state is a state in which no device is connected to the USB interface of the first device. The first connected state is a state in which the second device is connected to the USB interface of the first device and the first device acts as a host device. In this state, the first device can actively transmit a control command for controlling the second device. The second connected state is a state in which the second device is connected to the USB interface of the first device and the first device acts as a slave device. In this state, the first device can passively receive a control command from the second device and respond to it.

Figure 1:
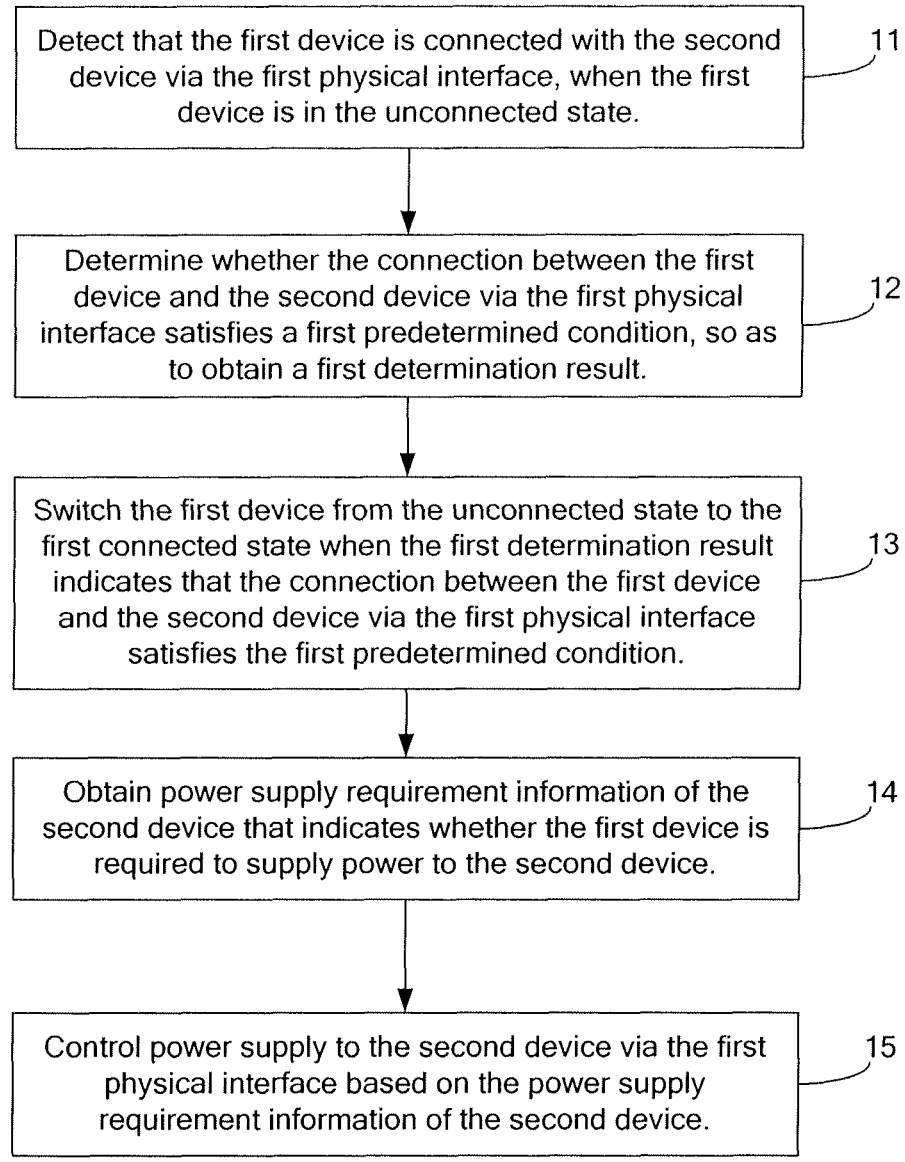
FIG. 1 is a flowchart illustrating the method for power supply control according to an embodiment.

Referring to FIG. 1, the method for power supply control according to this embodiment includes the following steps.

At step 11, when the first device is in the unconnected state, it is detected that the first device is connected with the second device via the first physical interface.

Here, the first device can detect a level variation at the first physical interface and determine whether the second device is connected to the first physical interface or not based on the level variation.

At step 12, it is determined whether the connection between the first device and the second device via the first physical interface satisfies a first predetermined condition or not, so as to obtain a first determination result.

At step 13, the first device is switched from the unconnected state to the first connected state when the first determination result indicates that the connection between the first device and the second device via the first physical interface satisfies the first predetermined condition.

Figure 2:
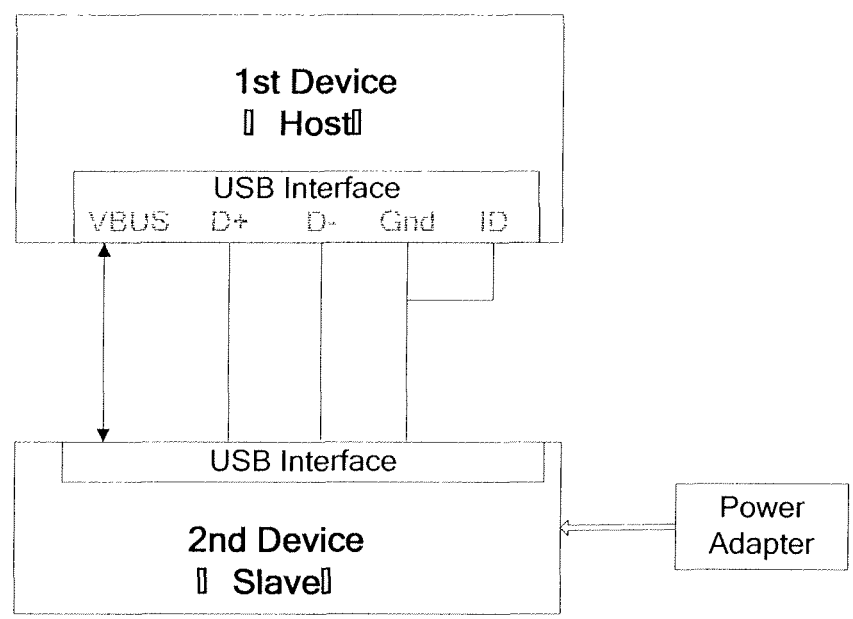
FIG. 2 is a schematic diagram showing the structure of a USB interface applied in an embodiment.

Taken the USB interface shown in FIG. 2 as an example, when the first device is connected with the second device via the first physical interface and an ID pin of the first physical interface is at a low level (i.e., the ID pin is short connected with the ground, GND, pin), the first device can be switched from the unconnected state to the first connected state in which the first device acts as a host device. At this time, the second device acts as a slave device.

At step 14, power supply requirement information of the second device that indicates whether the first device is required to supply power to the second device is obtained or not.

In the step 14, the power supply requirement information of the second device can be obtained by means of information interaction between the first and second devices. The first device can transmit a first control command to the second device for requesting the power supply requirement information of the second device. Then the first device receives the power supply requirement information fed back from the second device in response to the first control command Here, upon receiving the first control command, the second device determines whether it needs power supply from the first device or not based on a second power source parameter of its own (such as information on its battery capacity or a power parameter of its power source) and then feeds back the power supply requirement information.

Further, the first control command transmitted by the first device may carry a first power source parameter of the first device itself, such as information on its battery capacity or a power parameter of its power source. Upon receiving the first control command, the second device obtains the power source parameter carried by the first control command and compares it with the second power source parameter of the second device itself (such as information on the battery capacity or a power parameter of the power source of the second device), so as to obtain a comparison result. Then, the second device feeds back the power supply requirement information back to the first device based on the comparison result. For example, when the second power source parameter is superior to the first power source parameter, first power supply requirement information is fed back to the first device, indicating that the first device is not required to supply power to the second device. When the second power source parameter is inferior to the first power source parameter, second power supply requirement information is fed back to the first device, indicating that the first device is required to supply power to the second device.

Of course, if the second device does not have its own power source and the first device does not supply power to the second device after switching to the first connected state, then the second device would not be able to respond to the first control command. If the first device fails to receive any power supply requirement information fed back from the second device for a predetermined latency, it is possible that the second device does not have any power supply unit. In this case, the first device may obtain the power supply requirement information indicating that the first device is required to supply power to the second device.

At step 15, power supply to the second device via the first physical interface is controlled based on the power supply requirement information of the second device.

With the above steps, when the first device is in the first connected state, it can obtain the power supply requirement information of the second device. Then, the first device determines whether it is required to supply power to the second device or not based on the power supply requirement information. In this way, when the first device is in the first connected state, it will not supply power to the second device unreasonably. The power supply is thus more flexible and can be applied in various application scenarios. For example, when the second device has its own power source, i.e., when it is self-powered, there is no need for the first device to supply power to the second device, thereby reducing unnecessary power consumption by the first device.

Preferably, in this embodiment, the above step 14 can include the following steps for obtaining the power supply requirement information.

At step 141, no power is supplied to the second device via the first physical interface after the first device is switched from the unconnected state to the first connected state.

At step 142, a predetermined signal from the second device is detected at the first physical interface for a first predetermined time period, so as to obtain a first detection result.

At step 143, the power supply requirement information is obtained based on the first detection result.

For example, when the first detection result indicates that the predetermined signal is detected for the first predetermined time period, it is determined that the second device is operable and is detected validly. In this case, the first power supply requirement information can be obtained, indicating that the first device is not required to supply power to the second device. On the contrary, when the first detection result indicates that the predetermined signal is not detected for the first predetermined time period, it is determined that the second device is not operable. In this case, the second power supply requirement information can be obtained, indicating that the first device is required to supply power to the second device.

Again, for the USB interface shown in FIG. 2 as an example, if the second device has its own power source (e.g., it is connected to an external power source via a power adapter or it includes its own battery pack), its data pin D+ will be pulled up and thus the first device can detect a corresponding pull-up signal at the data pin D+ of its USB interface. In this case, there is no need for the first device to supply power to the second device and the first power supply requirement information is obtained. Otherwise, the second power supply requirement information is obtained.

Preferably, in this embodiment, the above step 15 can include the following steps.

At step 151, it is controlled to supply power to the second device via the first physical interface when the power supply requirement information indicates that the first device is required to supply power to the second device.

At step 152, it is controlled not to supply power to the second device via the first physical interface when the power supply requirement information indicates that the first device is not required to supply power to the second device.

In particular, the above step 151 can include the following steps.

At step 1511, a current power supply state of the first device is obtained.

At step 1512, the current power supply state of the first device is maintained when the current power supply state indicates that the first device is supplying power to the second device.

At step 1513, power is supplied to the second device via the first physical interface when the current power supply state indicates that the first device is not supplying power to the second device.

In particular, the above step 152 can include the following steps.

At step 1521, a current power supply state of the first device is obtained.

At step 1522, the first device is stopped from supplying power to the second device via the first physical interface when the current power supply state indicates that the first device is supplying power to the second device.

At step 1523, the current power supply state of the first device is maintained when the current power supply state indicates that the first device is not supplying power to the second device.

Figure 3:
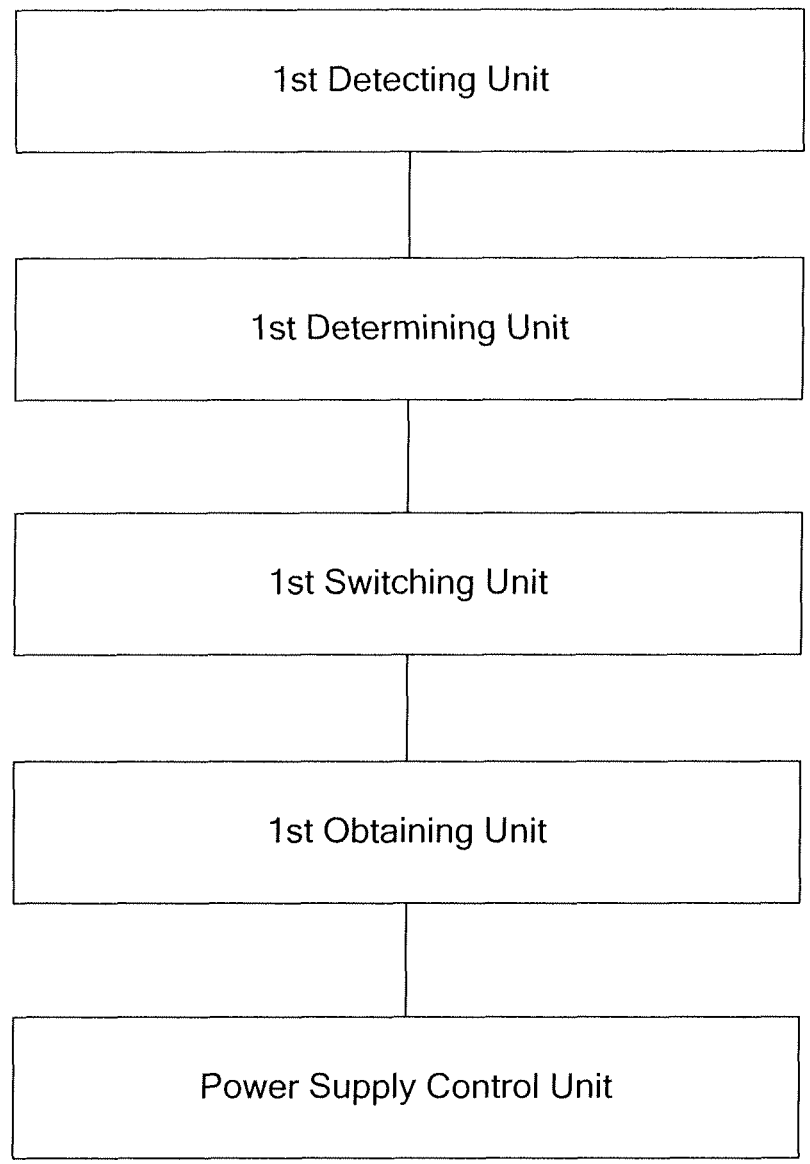
FIG. 3 is a schematic diagram showing the structure of the apparatus for power supply control according to an embodiment.

According to this embodiment, an apparatus for power supply control for a first device is also provided. The first device includes a first physical interface and has an unconnected state in which the first device is not connected with a second device via the first physical interface and a first connected state in which the first device is connected with the second device via the first physical interface so as to actively transmit a control command to the second device via the first physical interface. Referring to FIG. 3, the apparatus can include: a first detecting unit configured to detect that the first device is connected with the second device via the first physical interface, when the first device is in the unconnected state; a first determining unit configured to determine whether the connection between the first device and the second device via the first physical interface satisfies a first predetermined condition or not, so as to obtain a first determination result; a first switching unit configured to switch the first device from the unconnected state to the first connected state when the first determination result indicates that the connection between the first device and the second device via the first physical interface satisfies the first predetermined condition; a first obtaining unit configured to obtain power supply requirement information of the second device that indicates whether the first device is required to supply power to the second device or not; and a power supply control unit configured to control power supply to the second device via the first physical interface based on the power supply requirement information of the second device.

In a preferred embodiment, the first obtaining unit can include: a sixth processing unit configured to refrain from supplying power to the second device via the first physical interface after the first device is switched from the unconnected state to the first connected state; a second detecting unit configured to detect, at the first physical interface, a predetermined signal from the second device for a first predetermined time period, so as to obtain a first detection result; and an analysis obtaining unit configured to obtain the power supply requirement information based on the first detection result.

In another preferred embodiment, the first obtaining unit can obtain the power supply requirement information by means of information interaction with the second device. In this case, the first obtaining unit can include: a second transmitting unit configured to transmit a first control command to the second device for requesting the power supply requirement information of the second device; and a second receiving unit configured to receive the power supply requirement information fed back from the second device in response to the first control command.

Preferably, the power supply control unit can include: a first control unit configured to control to supply power to the second device via the first physical interface when the power supply requirement information indicates that the first is device is required to supply power to the second device; and a second control unit configured to control not to supply power to the second device via the first physical interface when the power supply requirement information indicates that the first device is not required to supply power to the second device.

More specifically, the first control unit can include: a second obtaining unit configured to obtain a current power supply state of the first device; a first processing unit configured to maintain the current power supply state of the first device when the current power supply state indicates that the first device is supplying power to the second device; and a second processing unit configured to supply power to the second device via the first physical interface when the current power supply state indicates that the first device is not supplying power to the second device.

The second control unit can include: a third obtaining unit configured to obtain a current power supply state of the first device; a third processing unit configured to stop the first device from supplying power to the second device via the first physical interface when the current power supply state indicates that the first device is supplying power to the second device; and a fourth processing unit configured to maintain the current power supply state of the first device when the current power supply state indicates that the first device is not supplying power to the second device.

Second Embodiment

Like the first embodiment, the method for power supply control according to this embodiment is applied in the first device. In this embodiment, after being switched from the unconnected state to the first connected state, the first device actively supplies power to the second device at first, and then determines whether to continue supplying power to the second device via the first physical interface or not based on the power supply requirement information of the second device.

In particular, the method for power supply control according to this embodiment includes the following steps.

At step 21, when the first device is in the unconnected state, it is detected that the first device is connected with the second device via the first physical interface.

At step 22, it is determined whether the connection between the first device and the second device via the first physical interface satisfies a first predetermined condition or not, so as to obtain a first determination result.

At step 23, when the first determination result indicates that the connection between the first device and the second device via the first physical interface satisfies the first predetermined condition, the first device is switched from the unconnected state to the first connected state and supplies power to the second device via the first physical interface.

At step 24, power supply requirement information of the second device that indicates whether the first device is required to supply power to the second device is obtained or not.

Here, in particular, the step of obtaining the power supply requirement information of the second device can include the following steps.

At step 241, a first control command is transmitted to the second device for requesting the power supply requirement information of the second device.

At step 242, the power supply requirement information fed back from the second device in response to the first control command is received.

At step 25, power supply to the second device via the first physical interface is controlled based on the power supply requirement information of the second device.

In the above step 23, the first device supplies power to the second device immediately after it is switched to the first connected state. Then in the step 25, the following determination and processing are carried out.

When the power supply requirement information indicates that the first device is required to supply power to the second device, the currently power supply state of the first device is maintained.

When the power supply requirement information indicates that the first device is not required to supply power to the second device, the first device is stopped from supplying power to the second device.

Some electronic devices do not have their own power sources and thus can only operate with power supplied from the first device (host device). Thus, in the above step 23, the first device supplies power to the second device immediately after it is switched to the first connected state, so as to ensure the operability of the second device. Then, the first device determines whether to stop or maintain the power supply based on the power supply requirement information.

According to this embodiment, an apparatus for power supply control for a first device is also provided. The first device includes a first physical interface and has an unconnected state in which the first device is not connected with a second device via the first physical interface and a first connected state in which the first device is connected with the second device via the first physical interface so as to actively transmit a control command to the second device via the first physical interface.

The apparatus can include: a first detecting unit configured to detect that the first device is connected with the second device via the first physical interface, when the first device is in the unconnected state; a first determining unit configured to determine whether the connection between the first device and the second device via the first physical interface satisfies a first predetermined condition or not, so as to obtain a first determination result; a first switching unit configured to switch the first device from the unconnected state to the first connected state when the first determination result indicates that the connection between the first device and the second device via the first physical interface satisfies the first predetermined condition; a first obtaining unit configured to obtain power supply requirement information of the second device that indicates whether the first device is required to supply power to the second device or not; and a power supply control unit configured to control power supply to the second device via the first physical interface based on the power supply requirement information of the second device.

Here, after the first switching unit switches the first device from the unconnected state to the first connected state, the first device supplies power to the second device, so as to ensure the operability of the second device. In this case, the first switching unit can include: a first switch processing unit configured to switch the first device from the unconnected state to the first connected state; and a power supplying unit configured to supply power to the second device via the first physical interface.

Preferably, the first obtaining unit can obtain the power supply requirement information of the second device by interacting with the second device. In this case, the first obtaining unit can include: a second transmitting unit configured to transmit a first control command to the second device for requesting the power supply requirement information of the second device; and a second receiving unit configured to receive the power supply requirement information fed back from the second device in response to the first control command.

Third Embodiment

Like the first embodiment, the method for power supply control according to this embodiment is applied in the first device. In this embodiment, when the power supply requirement information indicates that the first device is not required to supply power to the second device, it is further determined whether the second device can charge the first device or not. In this way, the electric power of the second device can be reasonably utilized to increase the battery lifetime of the first device.

At step 31, when the first device is in the unconnected state, it is detected that the first device is connected with the second device via the first physical interface.

At step 32, it is determined whether the connection between the first device and the second device via the first physical interface satisfies a first predetermined condition or not, so as to obtain a first determination result.

At step 33, when the first determination result indicates that the connection between the first device and the second device via the first physical interface satisfies the first predetermined condition, the first device is switched from the unconnected state to the first connected state and supplies power to the second device via the first physical interface.

At step 34, power supply requirement information of the second device that indicates whether the first device is required to supply power to the second device is obtained or not.

At step 35, power supply to the second device via the first physical interface is controlled based on the power supply requirement information of the second device.

In the above step 35, the following determination and processing are carried out.

At step 351, when the power supply requirement information indicates that the first device is required to supply power to the second device, the currently power supply state of the first device is maintained.

At step 352, when the power supply requirement information indicates that the first device is not required to supply power to the second device, the first device is stopped from supplying power to the second device.

Some electronic devices have their own power sources with sufficient electric power. These electronic devices do not need power supply from the first device (host device) and have sufficient electric power to charge the first device. In this case, the above step 352 can include the following steps.

At step 3521, charging capability information of the second device is obtained.

At step 3522, no power is supplied to the second device via the first physical interface when the charging capability information indicates that the first device is not required to supply power to the second device.

At step 3523, a charging request is transmitted to the second device when the charging capability information indicates that the second device is capable of charging the first device and then power is received from the second device for charging the first device via the first physical interface.

Here, the charging capability information of the second device obtained in the step 3521 can alternatively be obtained in the step 34. That is, in the step 34, the charging capability information of the second device is obtained in addition to the power supply requirement information of the second device.

In the above step 3521, the charging capability information of the second device can be obtained by: the first device transmitting a second control command to the second device for requesting the charging capability information of the second device; and the first device receiving the charging capability information fed back from the second device in response to the second control command.

Preferably, upon receiving the second control command, the second device determines whether it has its own power source or not. If the second device has its own power source, it feeds first charging capability information back to the first device, indicating that it is capable of charging the first device; otherwise, the second device feeds first charging capability information back to the first device, indicating that it is incapable of charging the first device.

Preferably, the second control command transmitted by the first device may carry a first power source parameter of the first device itself, such as information on its battery capacity or a power parameter of its power source. Upon receiving the second control command, the second device obtains the power source parameter carried by the second control command and compares it with the second power source parameter of the second device itself (such as information on the battery capacity or a power parameter of the power source of the second device), so as to obtain a first comparison result. Then, the second device feeds the charging capability information back to the first device based on the first comparison result. For example, when the second power source parameter is superior to the first power source parameter, the first charging capability information is fed back to the first device, indicating that the second device is capable of charging the first device. When the second power source parameter is inferior to the first power source parameter, the first charging capability information is fed back to the first device, indicating that the second device is incapable of charging the first device.

Again, for the USB interface shown in FIG. 2 as an example, conventionally, when the first device is in the first connected state (host), it supplies power (Vout) to the second device (device) via the VBUS pin of its USB interface. However, when the method of this embodiment is applied, when the first device is in the first connected state (host), it can receive power (Vin) from the second device (device) at the VBUS pin for charging itself.

Based on the above method, according to this embodiment, an apparatus for power supply control for a first device is also provided. The first device includes a first physical interface and has an unconnected state in which the first device is not connected with a second device via the first physical interface and a first connected state in which the first device is connected with the second device via the first physical interface so as to actively transmit a control command to the second device via the first physical interface. The apparatus can include: a first detecting unit configured to detect that the first device is connected with the second device via the first physical interface, when the first device is in the unconnected state; a first determining unit configured to determine whether the connection between the first device and the second device via the first physical interface satisfies a first predetermined condition or not, so as to obtain a first determination result; a first switching unit configured to switch the first device from the unconnected state to the first connected state when the first determination result indicates that the connection between the first device and the second device via the first physical interface satisfies the first predetermined condition; a first obtaining unit configured to obtain power supply requirement information of the second device that indicates whether the first device is required to supply power to the second device or not; and a power supply control unit configured to control power supply to the second device via the first physical interface based on the power supply requirement information of the second device.

Here, the power supply control unit includes: a first control unit configured to control to supply power to the second device via the first physical interface when the power supply requirement information indicates that the first device is required to supply power to the second device; and a second control unit configured to control not to supply power to the second device via the first physical interface when the power supply requirement information indicates that the first device is not required to supply power to the second device.

In particular, the second control unit can include the following units for reversely charging the first device by the second device: a fourth obtaining unit configured to obtain charging capability information of the second device; a fifth processing unit configured to control not to supply power to the second device via the first physical interface when the charging capability information indicates that the first device is not required to supply power to the second device; a first transmitting unit configured to transmit a charging request to the second device when the charging capability information indicates that the second device is capable of charging the first device; and a first receiving unit configured to receive power from the second device for charging the first device via the first physical interface.

Figure 4:
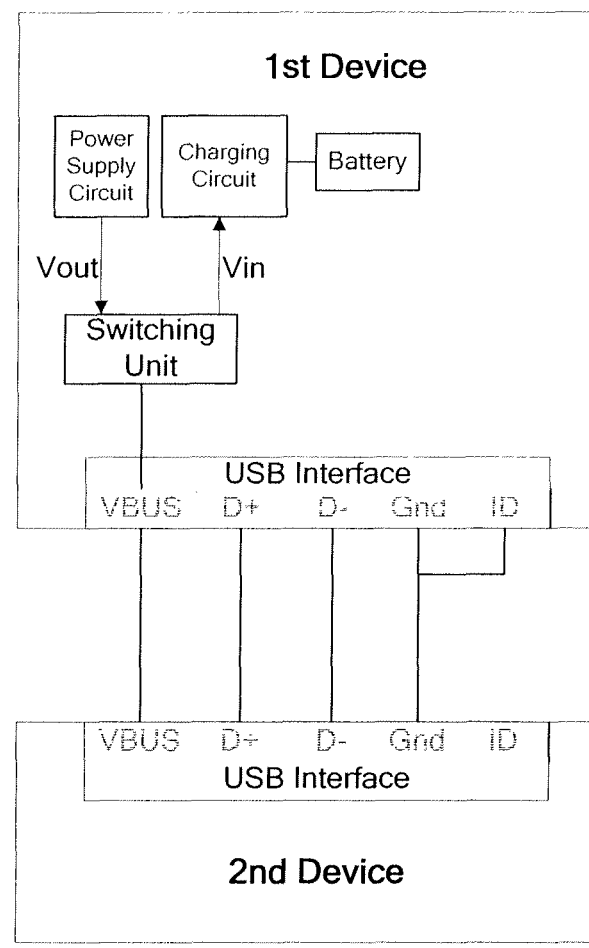
FIG. 4 is a schematic diagram showing the structure according to an embodiment when applied to a USB interface.

As shown in FIG. 4, FIG. 4 shows a particular hardware solution for controlling charging or power supplying when the first physical interface is a USB interface. In ci this case, the apparatus for power supply control according to this embodiment is further provided with a switching unit. One terminal of the switching unit is connected to the VBUS pin of the USB interface and the other terminal of the switching unit is connected to one of a charging circuit and a power supplying circuit. Here, the charging circuit is further connected with a battery (or battery pack). The switching unit can be a connection switch for connecting the VBUS pin to either, or none, of charging circuit and the power supplying circuit.

In this way, the first control unit as described above can control the switching unit to connect the VBUS pin to the power supplying circuit, thereby supplying power to the external second device via the VBUS pin. The second control unit or the fifth processing unit as described above can control the switching unit to disconnect the VBUS pin from the power supplying circuit, thereby not supplying power to the second device. In addition, after transmitting the charging request, the first transmitting unit as described above can control the switching unit to connect the VBUS pin to the charging circuit, thereby receiving power from the VBUS pin for charging the battery.

Similarly, the second device can be provided with the same switching unit, so as to cooperate with the first device for receiving power supplied from the first device to the second device or charging the first device.

The present invention has been described above from the perspective of the first device. In the following, the present invention will be further explained from the perspective of the second device.

Fourth Embodiment

According to this embodiment, a method for power supply control is provided. The method is applied in a second device which includes a second physical interface. The second device can have its second physical interface connected to the first physical interface of the first device described above with respect to the previous embodiment, so as to be connected to the first device.

The second device has an unconnected state, a first connected state and a second connected state. Here the unconnected state is a state in which the second device is not connected with first device via the second physical interface. The first connected state is a state in which the second device is connected with the first device via the second physical interface so as to actively transmit a control command to the first device via the second physical interface. The second connected state is a state in which the second device is connected with the first device via the second physical interface so as to passively receive a control command from the first device via the second physical interface.

In particular, the method for power supply control according to this embodiment includes the following steps.

At step 41, when the second device is in the unconnected state, it is detected that the second device is connected with the first device via the second physical interface.

At step 42, it is determined whether the connection between the second device and the first device via the second physical interface satisfies a second predetermined condition or not, so as to obtain a second determination result.

At step 43, the second device is switched from the unconnected state to the second connected state when the second determination result indicates that the connection between the second device and the first device via the second physical interface satisfies the second predetermined condition.

For the USB interface as an example, when the second device is connected with the first device via the second physical interface and the ID pin of the second physical interface is at a high level, the second device can be switched from the unconnected state to the second connected state in which the second device acts as a slave device. At this time, the first device acts as a host device.

Here, the step 43 of switching the second device from the unconnected state to the second connected state can includes switching the second device from the unconnected state to the second connected state; and receiving power from the first device via the second physical interface. That is, after entering the second connected state, the second device can operate with the power supplied from the first device.

At step 44, power supply requirement information of the second device is fed back to the first device, such that the first device controls power supply to the second device via the second physical interface based on the power supply requirement information.

Here, the power supply requirement information indicates whether the first device is required to supply power to the second device or not. When the first device is required to supply power to the second device, the power supply requirement information causes the first device to supply power to the second device via the first physical interface. When the first device is not required to supply power to the second device, the power supply requirement information causes the first device not to supply power to the second device.

In a preferred embodiment, the step 44 can include the following steps.

At step 441, a first control command transmitted from the first device for requesting the power supply requirement information of the second device is received.

At step 442, the power supply requirement information is fed back to the first device in response to the first control command.

Here, upon receiving the first control command, the second device determines whether it needs power supply from the first device or not based on a second power source parameter of its own (such as information on its battery capacity or a power parameter of its power source) and then feeds back the power supply requirement information. For example, when the battery level of the second device is lower than a first preset threshold or the power level of the power source of the second device is lower than a second preset threshold, it can be determined that the first device is required to supply power to the second device. On the contrary, when the battery level of the second device is higher than a first preset threshold or the power level of the power source of the second device is higher than a second preset threshold, it can be determined that the first device is not required to supply power to the second device.

Further, the first control command transmitted by the first device may carry a first power source parameter of the first device itself, such as information on its battery capacity or a power parameter of its power source. Upon receiving the first control command, the second device obtains the power source parameter carried by the first control command and compares it with the second power source parameter of the second device itself (such as information on the battery capacity or a power parameter of the power source of the second device), so as to obtain a comparison result. Then, the second device feeds the power supply requirement information back to the first device based on the comparison result. For example, when the second power source parameter is superior to the first power source parameter, first power supply requirement information is fed back to the first device, indicating that the first device is not required to supply power to the second device. When the second power source parameter is inferior to the first power source parameter, second power supply requirement information is fed back to the first device, indicating that the first device is required to supply power to the second device.

Furthermore, the second device may feed its own charging capability information back to the first device. The method for power supply control according to this embodiment can further include the following steps.

At step 46, the charging capability information of the second device is fed back to the first device.

Here, the charging capability information in the step 46 can alternatively be fed back to the first device along with the power supply requirement information in the step 44.

At step 47, a charging request transmitted from the first device when the charging capability information indicates that the second device is capable of charging the first device is received.

At step 48, the first device is charged via the second physical interface in response to the charging request.

The method may include a step 45 prior to the step 46, in which a second control command transmitted from the first device for requesting the charging capability information of the second device is received. Then, in the step 46, the charging capability information is fed back in response to the second control command.

In particular, in the above step 46, the charging capability information can be determined as follows and then fed back to the first device. The second device determines whether it has its own power source or not. If it has its own power source, it feeds first charging capability information back to the first device, indicating that it is capable of charging the first device; otherwise, it feeds first charging capability information back to the first device, indicating that it is incapable of charging the first device.

Preferably, the second control command transmitted by the first device may carry a first power source parameter of the first device itself. In this case, in the step 46, the charging capability information can be determined as follows. Upon receiving the second control command, the second device obtains the power source parameter carried by the second control command and compares it with the second power source parameter of the second device itself (such as information on the battery capacity or a power parameter of the power source of the second device), so as to obtain a first comparison result. Then, the second device feeds the charging capability information back to the first device based on the first comparison result. For example, when the second power source parameter is superior to the first power source parameter, the first charging capability information is fed back to the first device, indicating that the second device is capable of charging the first device. When the second power source parameter is inferior to the first power source parameter, the first charging capability information is fed back to the first device, indicating that the second device is incapable of charging the first device.

According to this embodiment, an apparatus for power supply control for a second device is provided. The second device includes a second physical interface and has an unconnected state in which the second device is not connected with a first device via the second physical interface and a second connected state in which the second device is connected with the first device via the second physical interface so as to passively receive a control command from the first device via the second physical interface.

In particular, the apparatus can include: a third detecting unit configured to detect that the second device is connected with the first device via the second physical interface, when the second device is in the unconnected state; a second determining unit configured to determine whether the connection between the second device and the first device via the second physical interface satisfies a second predetermined condition or not, so as to obtain a second determination result; a second switching unit configured to switch the second device from the unconnected state to the second connected state when the second determination result indicates that the connection between the second device and the first device via the second physical interface satisfies the second predetermined condition; and a first feedback unit configured to feed power supply requirement information of the second device back to the first device, such that the first device controls power supply to the second device via the second physical interface based on the power supply requirement information.

Preferably, the second switching unit can include: a second switch processing unit configured to switch the second device from the unconnected state to the second connected state; and a power receiving unit configured to receive power from the first device via the second physical interface.

Preferably, the feedback unit can include: a third receiving unit configured to receive a first control command transmitted from the first device for requesting the power supply requirement information of the second device; and a third transmitting unit configured to feed the power supply requirement information back to the first device in response to the first control command.

Preferably, according to this embodiment, the second device can charge the first device when it is in the second connected state. In this case, the apparatus can further include: a second feedback unit configured to feed charging capability information of the second device back to the first device; a third receiving unit configured to receive a charging request transmitted from the first device when the charging capability information indicates that the second device is capable of charging the first device; and a charging unit configured to charge the first device via the second physical interface in response to the charging request.

Fifth Embodiment

According to an embodiment of the present invention, an electronic device is provided. The electronic device includes a physical interface including a first channel for transmitting (sending or receiving) power and a second channel for transmitting (sending or receiving) a control command. The first channel and the second channel are capable of operating simultaneously.

The electronic device further includes a processing unit configured to set the electronic device into a first operation state or a second operation state.

Here, the electronic device in the first operation state is capable of supplying power to an external device connected to the electronic device via the first channel of the physical interface and receiving a control command from the external device via the second channel of the physical interface. The electronic device in the second operation state is capable of receiving power for charging the electronic device via the first channel of the physical interface and outputting a control command to the external device via the second channel of the physical interface.

In particular, when the electronic device is in the first operation state, it can supply power to the connected external device via the first channel of the physical interface while receiving a first control command generated by, and input from, the external device via the second channel of the physical interface. Here, in the case where the electronic device is connected with the external device, the first control command can only be generated by the external device.

When the electronic device is in the second operation state, it can receive power for charging the electronic device from the external device via the first channel of the physical interface while outputting a second control command to the external device via the second channel of the physical interface. Here, in the case where the electronic device is connected with the external device, the second control command can only be generated by the electronic device.

It can be seen that, unlike the similar physical interface in the prior art that can only operate in a single-channel state or a unidirectional dual-channel state, the embodiment of the present invention enables a bidirectional dual-channel operation state. Therefore, the operation modes of the electronic device can be more flexible, such that various user requirements can be better satisfied.

The above embodiments of the present invention can be applied to existing interfaces based on the USB protocol standard and further evolutions of USB interfaces.

While the present invention has been described above with reference to the embodiments, it can be appreciated by those skilled in the art that various improvements and modifications can be made without departing from the principle of the present invention and these improvements and modifications are to be encompassed by the scope of the present invention.

What is claimed is:

1. An apparatus for power supply control for a first device, the first device including a first physical interface and having an unconnected state in which the first device is not connected with a second device via the first physical interface and a first connected state in which the first device is connected with the second device via the first physical interface so as to actively transmit a control command to the second device via the first physical interface, the apparatus configured to:
   detect that the first device is connected with the second device via the first physical interface, when the first device is in the unconnected state;
   determine whether the connection between the first device and the second device via the first physical interface satisfies a first predetermined condition or not, so as to obtain a first determination result;
   switch the first device from the unconnected state to the first connected state when the first determination result indicates that the connection between the first device and the second device via the first physical interface satisfies the first predetermined condition;
   obtain power supply requirement information of the second device that indicates whether the first device is required to supply power to the second device or not;
   control power supply to the second device via the first physical interface based on the power supply requirement information of the second device;
   wherein the apparatus is further configured to control to supply power to the second device via the first physical interface when the power supply requirement information indicates that the first device is required to supply power to the second device;
   control not to supply power to the second device via the first physical interface when the power supply requirement information indicates that the first device is not required to supply power to the second device;
   wherein the apparatus is further configured to obtain charging capability information of the second device, control not to supply power to the second device via the first physical interface when the power supply requirement information indicates that the first device is not required to supply power to the second device, transmit a charging request to the second device when the charging capability information indicates that the second device is capable of charging the first device, and receive power from the second device for charging the first device via the first physical interface.

2. The apparatus of claim 1, wherein the apparatus is further configured to:
   obtain a current power supply state of the first device;
   maintain the current power supply state of the first device when the current power supply state indicates that the first device is supplying power to the second device; and
   supply power to the second device via the first physical interface when the current power supply state indicates that the first device is not supplying power to the second device, and
   obtain a current power supply state of the first device;
   stop the first device from supplying power to the second device via the first physical interface when the current power supply state indicates that the first device is supplying power to the second device; and
   maintain the current power supply state of the first device when the current power supply state indicates that the first device is not supplying power to the second device.

3. The apparatus of claim 1, wherein the apparatus is further configured to:
   switch the first device from the unconnected state to the first connected state; and
   supply power to the second device via the first physical interface.

4. The apparatus of claim 1, wherein the apparatus is further configured to:
   transmit a first control command to the second device for requesting the power supply requirement information of the second device; and
   receive the power supply requirement information fed back from the second device in response to the first control command.

5. The apparatus of claim 1, wherein the apparatus is further configured to:
   refrain from supplying power to the second device via the first physical interface after the first device is switched from the unconnected state to the first connected state;
   detect, at the first physical interface, a predetermined signal from the second device for a first predetermined time period, so as to obtain a first detection result; and
   obtain the power supply requirement information based on the first detection result.

6. An apparatus for power supply control for a second device, the second device including a second physical interface and having an unconnected state in which the second device is not connected with a first device via the second physical interface and a second connected state in which the second device is connected with the first device via the second physical interface so as to passively receive a control command from the first device via the second physical interface, the apparatus configured to:
- detect that the second device is connected with the first device via the second physical interface, when the second device is in the unconnected state;
- determine whether the connection between the second device and the first device via the second physical interface satisfies a second predetermined condition or not, so as to obtain a second determination result;
- switch the second device from the unconnected state to the second connected state when the second determination result indicates that the connection between the second device and the first device via the second physical interface satisfies the second predetermined condition; and
- feed power supply requirement information of the second device back to the first device, such that the first device controls power supply to the second device via the second physical interface based on the power supply requirement information,
- wherein the apparatus is further configured to feed charging capability information of the second device back to the first device, receive a charging request transmitted from the first device when the charging capability information indicates that the second device is capable of charging the first device, and charge the first device via the second physical interface in response to the charging request.

7. The apparatus of claim 6, wherein the apparatus is further configured to:
- switch the second device from the unconnected state to the second connected state; and
- receive power from the first device via the second physical interface.

8. The apparatus of claim 6, wherein the apparatus is further configured to:
- receive a first control command transmitted from the first device for requesting the power supply requirement information of the second device; and
- feed the power supply requirement information back to the first device in response to the first control command.

* * * * *